Aug. 11, 1936.　　　A. D. McCOLLUM　　　2,050,497
SELF ALIGNING DRIVE SHAFT
Filed Dec. 15, 1934　　2 Sheets-Sheet 1
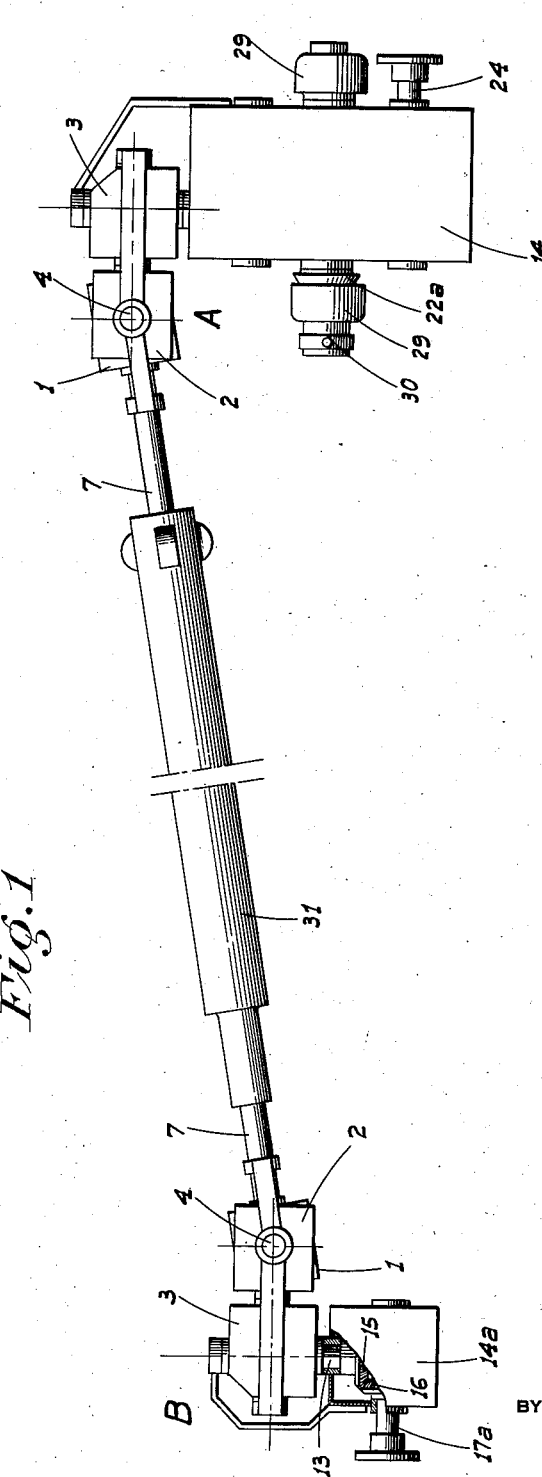
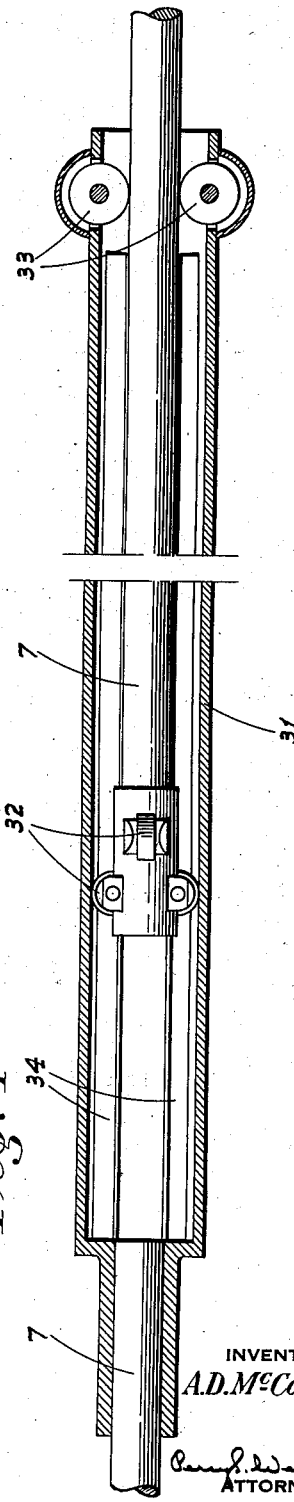
INVENTOR
A.D.McCollum
ATTORNEY Aug. 11, 1936.  A. D. McCOLLUM  2,050,497
SELF ALIGNING DRIVE SHAFT
Filed Dec. 15, 1934  2 Sheets-Sheet 2

INVENTOR
A. D. McCollum
BY
ATTORNEY

Patented Aug. 11, 1936

2,050,497

UNITED STATES PATENT OFFICE 2,050,497

SELF-ALIGNING DRIVE SHAFT

Alvie D. McCollum, Stockton, Calif., assignor of one-half to Jack C. Sanford, Stockton, Calif.

Application December 15, 1934, Serial No. 757,700

3 Claims. (Cl. 74—385)

This invention relates to self aligning or flexible drive shafts of this type used in transmitting power between parts on two relatively movable objects. I have particularly in mind the control of the working parts of a scraper or other implement from the power plant of the tractor hauling the implement, though the use of my improved drive shaft is by no means limited to such service.

The power control of scraper operations for instance has previously been effected either by a cable and drum arrangement, the drum being mounted on and driven by the engine of the tractor; or by hydraulic means, the pressure necessary to operate which has been generated by said engine. The hydraulic means, while very flexible, has not proved satisfactory on account of the difficulty of maintaining pressure-tight fittings under conditions where the abrasive action of dirt and dust must be contended with, and such apparatus is also quite expensive.

Cables have a tendency to become tangled up if excessively slack and unless two drums are used they can only operate to impart power in one direction. Also they usually wear very quickly and must be frequently replaced.

The principal objects of my invention are to avoid the objectionable features of the present control mechanisms of this type by providing a flexible self-aligning drive shaft structure so constructed that it can be reversed to transmit power in either direction; it will function effectively irrespective of the relative position of angularity of the opposite ends of the shaft structure whether in horizontal or vertical planes; which will automatically extend or contract as the relative movement of the tractor and implement or other parts demand; and which will give efficient service indefinitely without excessive wear or replacement of parts being necessary.

These objects I accomplish by means of such structure and relative arrangement of parts as will fully appear by a perusal of the following specification and claims.

In the drawings similar characters of reference indicate corresponding parts in the several views:

Figure 1 is a plan view of my improved drive shaft.

Figure 4 is a sectional elevation of a telescopic shaft arrangement connecting the drive and driven units of the structure.

Figure 2:
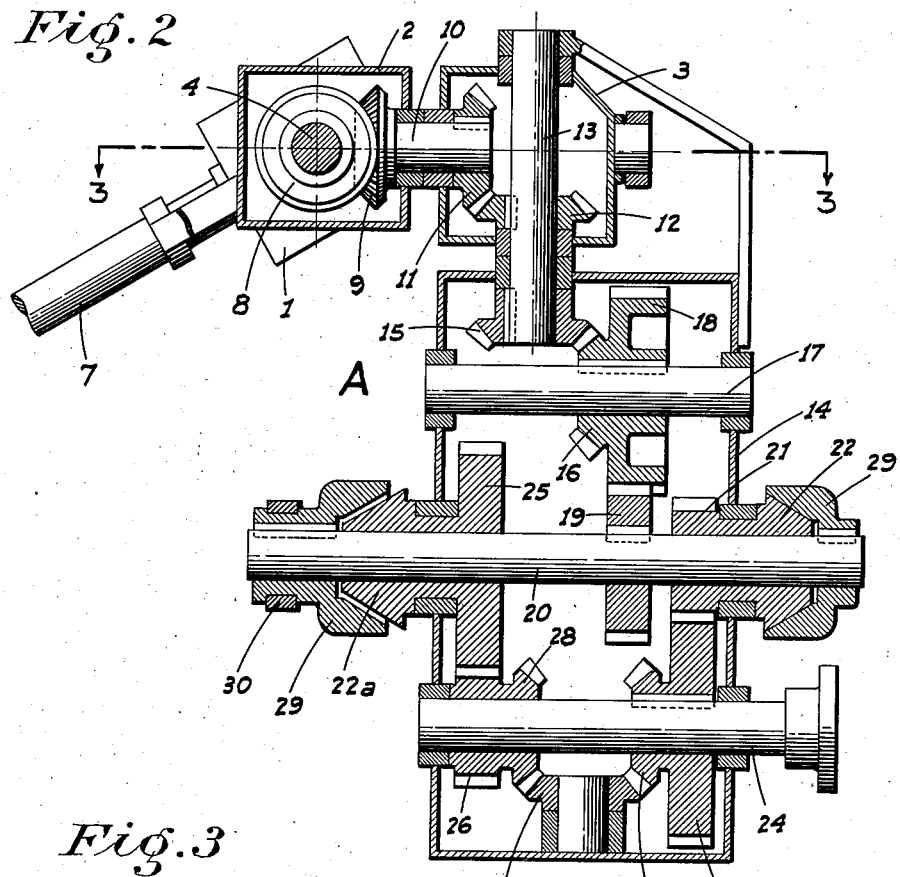
Figure 2 is an enlarged sectional plan of the drive end unit of the structure.
Figure 3:
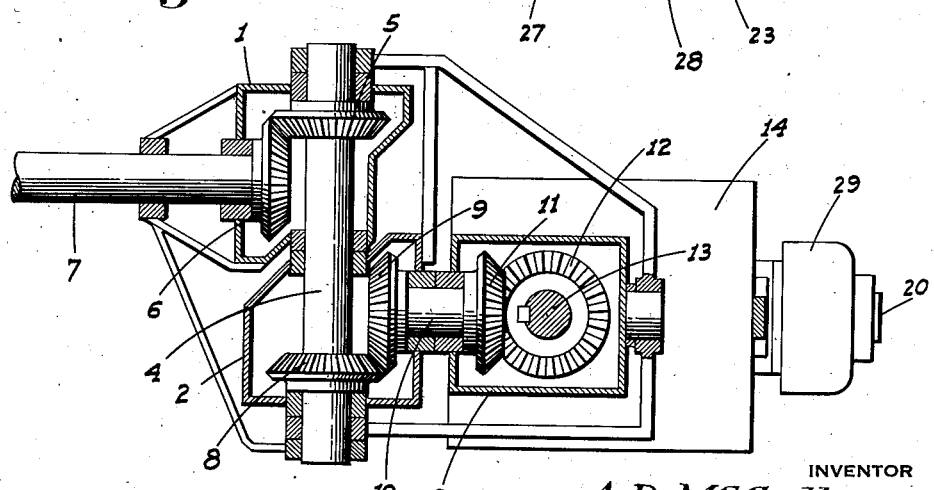
Figure 3 is a sectional elevation of the same on the line 3—3 of Figure 2.

Referring now more particularly to the characters of reference on the drawings, the shaft comprises a pair of units A and B, the unit A being disposed on the tractor, and the unit B on an implement or the like. Each unit includes like gear housings 1, 2 and 3 which are separate from each other, and since the housings of the unit A contain a gearing arrangement identical with those of the unit B it will be sufficient only to describe the arrangement of one such unit.

Extending through and journaled in the housings 1 and 2 and connecting the same in swivel relation is a shaft 4, normally disposed in a vertical plane. A bevel pinion 5 is secured to said shaft in the housing 1 and meshes with another bevel pinion 6 in the housing which is fixed on a shaft 7 disposed at right angles to the shaft 4. The shafts 7 of the two units A and B are axially aligned with and project toward each other, and are telescopically connected in non-turning relation in any suitable manner, which for large or heavy installations is preferably arranged as hereinafter described.

A bevel pinion 8 is mounted on the shaft 4 within the housing 2, which meshes with another bevel pinion 9 in said housing. The pinion 9 is fixed on a stub shaft 10 which swivelly connects the housings 1 and 3 and which is disposed at right angles to the shaft 4.

Another bevel pinion 11 is secured on the shaft 10 within the housing 3, which meshes with another bevel pinion 12 in said housing. The pinion 12 is fixed on a shaft 13 journaled in the housing 3 at right angles to the shaft 10. In the unit A said shaft 13 projects into a non-movable housing 14 and forms the swivel connection between said housings; and in the unit B the corresponding shaft 13 projects into a non-movable housing 14a and similarly forms the swivel connection between the housings. In both cases the shaft 13 carries a bevel pinion 15 disposed within the fixed housing which meshes with a bevel pinion 16 in said housing. In the housing 14 said pinion is fixed on a stub shaft 17 journaled in said housing and disposed in a plane at right angles to the shaft 13 but parallel to the plane of the shaft 10. In the housing 14a the corresponding pinion 16 is secured to a similarly disposed shaft 17a in the housing 14a which projects from the end of said housing furthest from the unit A and is adapted for connection to the mechanism to be controlled or driven, and forms the final driven end of my self-aligning shaft structure.

The shaft 17 however is merely a countershaft and besides the bevel pinion 16 has a spur gear 18 fixed thereon. This gear meshes with a pinion 19 fixed on a shaft 20 both slidably and turnably mounted in the housing 14 parallel to the shaft 17.

Turnably mounted on said shaft and journaled in the housing against axial movement is a spur pinion 21 having a cone clutch element 22 fixed thereon and disposed outside the housing. This pinion meshes with a gear 23 fixed on the initial drive shaft 24 of the structure which is journaled in the housing and projects from the end of the same furthest from the unit B for connection to an engine shaft, said shaft 24 being parallel to the shaft 20.

Also turnably mounted on the shaft 20 and journaled in the housing 14 against axial movement with the shaft is a spur gear 25 having a clutch element 22a rigid therewith outside the housing. This gear meshes with a pinion 26 turnable on the shaft 24. The pinion is constantly driven by said shaft 24 but in the opposite direction by means of an idler bevel pinion 27 turnably mounted in the housing 14 between the pinion 26 and gear 23 and engaging bevel pinions 28 fixed therewith. It will therefore be seen that the gear 25 constantly turns in one direction while the pinion 21 constantly turns in the opposite direction; the relative speed of rotation (which may be altered to suit different conditions) depending on the relative size of the meshing pairs of gears and pinions.

Secured on the ends of the shaft 20 beyond the clutch elements 22 and 22a are clutch elements 29 to cooperate therewith. One of said elements is provided with a shift-fork yoke 30 of conventional character, by means of which said shaft may be slid in one direction or the other by any suitable control means which it is not deemed necessary to show. The elements 29 are of course arranged so that only one at a time will be engaged with the corresponding clutch element so that the shaft 20 may be selectively placed in driving relation with the shaft 24 to rotate in either direction. It will thus be seen that the direction of rotation of the shaft 20 and consequently the shaft sections 7 and the ultimate driven shaft member 17a, may be selectively controlled. It will also be seen that the box 3 and all parts connected thereto may turn on the shaft 13 as an axis. Similarly the boxes 2 and 1 may independently turn on the shaft 10 as an axis while the box 1 may turn relative to the box 2 about the shaft 4 as an axis; these three directions of turning being in different planes. This turning movement holds true of both sets of gear boxes at both ends of the drive shaft structure so that a practically unlimited universal action between both ends of the structure is assured without any binding action being had regardless of the angularity of the parts and without interfering in any way with the efficiency of the drive.

It may here be noted that while I have shown plain bearings on the drawings for the various shafts, roller or any other type of bearing may be used where the same may be advantageous to promote efficient and long wearing operation.

If a dual unit is desired, it is obvious that the one engine-connected shaft 24 may be used; the duplicate gearing necesary to provide a dual unit branching off from said shaft in opposed relation to the gearing of the single unit.

The telescoping shaft feature of course provides an additional relative movement between the end units of the structure and is necessary when the shaft ends are mounted on separate relatively movable objects, such as a tractor and a drawn implement, in which case the length between the fixed ends of the drive structure alter when the tractor and implement are rounding a turn.

The special telescopic arrangement of the two shaft sections 7, as shown in Figure 4, comprises a relatively long sleeve 31 secured to the outer end of one section 7 and enveloping the adjacent portion of the other section in clearance relation thereto. A plurality of radially arranged rollers 32 are mounted on the inner end of the enveloped section, which engage the bore of the sleeve, while similar rollers 33 are mounted on the outer end of the sleeve to engage the periphery of the adjacent shaft section 7. Secured in and extending along the sleeve between the rollers 32 are ribs 34 which cooperate with the rollers 32 or their bearings to prevent relative rotation between the sleeve and the inner shaft section 7. In this manner said inner shaft section has free movement along the sleeve but the two must turn together. This arrangement is to be preferred to the ordinary spline shaft structure for installations subject to contact with dirt etc. which has a severe abrasive action on ordinary close fitting splines, and tends to cause binding and rapid wear of the same.

It will be noted that all the gears are enclosed, so that they may easily be kept well lubricated, and a very safe unit is provided, with no likelihood of danger to the operator, as is the case when cables snap or air lines break.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A universal joint unit comprising a relatively fixed drive shaft, a second shaft disposed at right angles to the drive shaft, a support for said second shaft turnable on the drive shaft as an axis, gearing connections between said shafts, a third shaft disposed at right angles to the second shaft, a housing supporting said third shaft at spaced points in its length, turnably mounted on the second shaft, gearing connections between the second and third shafts disposed within the housing, a second housing turnably mounted on the third shaft beyond the first named housing, a fourth shaft journaled in and projecting from the second housing at right angles to the third shaft, and gearing connections between the third and fourth shafts disposed within said second housing.

2. A structure as in claim 1, with brace arms in which the opposite ends of the third shaft are turnable, and means turnably mounting the arms as a unit in axial alignment with the second shaft on that side of the drive shaft which is opposite said second shaft.

3. A universal joint unit comprising a relatively fixed drive shaft, a turnable housing into which said shaft turnably projects, a second shaft journaled in and projecting from one side of the housing radially of the drive shaft, gearing connections between said shafts within the housing, a second housing turnably supported for rotation about the second shaft as an axis and into which the latter projects, a third shaft turnably supported in said second housing and disposed at an angle to the second shaft, connections between said second and third shafts within the second housing, brace arms rigid at one end with the second housing on opposite sides thereof and extending on opposite sides of the first housing, and means turnably mounting the arms as a unit in axial alignment with the second shaft on that side of the first housing opposite said second shaft.

ALVIE D. McCOLLUM.